(12) United States Patent
Jeong et al.

(10) Patent No.: US 9,647,580 B2
(45) Date of Patent: May 9, 2017

(54) WIRELESS SIGNAL TRANSMITTING APPARATUS AND WIRELESS ILLUMINATION CONTROL APPARATUS USING THE SAME

(71) Applicant: SAMSUNG ELECTRO-MECHANICS CO., LTD., Suwon-si (KR)

(72) Inventors: In Wha Jeong, Suwon-si (KR); Dong Seong Oh, Suwon-si (KR); Hugh Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/074,021

(22) Filed: Mar. 18, 2016

(65) Prior Publication Data

US 2017/0019038 A1    Jan. 19, 2017

(30) Foreign Application Priority Data

Jul. 14, 2015    (KR) ........................ 10-2015-0100060

(51) Int. Cl.
    *H01K 1/62*        (2006.01)
    *H02N 2/18*        (2006.01)
    *H05B 37/02*      (2006.01)

(52) U.S. Cl.
    CPC ......... *H02N 2/188* (2013.01); *H05B 37/0272* (2013.01)

(58) Field of Classification Search
    CPC ........................... H03K 17/964; H01L 41/113
    USPC ..................... 315/55; 310/311, 328
    See application file for complete search history.

(56) References Cited

U.S. PATENT DOCUMENTS

| | | | | |
|---|---|---|---|---|
| 6,630,894 | B1* | 10/2003 | Boyd .................. | H03K 17/964 310/311 |
| 6,700,310 | B2* | 3/2004 | Maue ..................... | B60R 25/24 310/319 |
| 6,933,655 | B2* | 8/2005 | Morrison ............... | B60R 25/24 310/314 |
| 7,084,529 | B2* | 8/2006 | Face .................... | H03K 17/964 307/116 |
| 8,446,069 | B2* | 5/2013 | Monig ................ | H03K 17/964 310/319 |
| 2002/0070635 | A1* | 6/2002 | Morrison ............... | B60R 25/24 310/311 |

FOREIGN PATENT DOCUMENTS

| | | |
|---|---|---|
| JP | 2013-226989 A | 11/2013 |
| KR | 10-2014-0139313 A | 12/2014 |

\* cited by examiner

*Primary Examiner* — Thuy Vinh Tran
(74) *Attorney, Agent, or Firm* — NSIP Law (57) ABSTRACT

A wireless signal transmitting apparatus, includes: a piezoelectric harvester configured to generate electrical energy responsive to user switch manipulation; and, a wireless communication circuit configured to generate wireless signals from the electrical energy and wirelessly transmit the wireless signals to an external wireless power receiving device.

20 Claims, 7 Drawing Sheets

WIRELESS SIGNAL TRANSMITTING APPARATUS AND WIRELESS ILLUMINATION CONTROL APPARATUS USING THE SAME

CROSS-REFERENCE TO RELATED APPLICATION(S)

This application claims the benefit under 35 U.S.C. §119(a) of Korean Patent Application No. 10-2015-0100060 filed on Jul. 14, 2015, in the Korean Intellectual Property Office, the entire disclosure of which is incorporated herein by reference for all purposes.

BACKGROUND

1. Field

The present disclosure relates to a wireless signal transmitting apparatus and a wireless illumination control apparatus using the same.

2. Description of Related Art

In accordance with the development of wireless technology, controlling, using wireless signals, has been performed in various applications. Due to the fact that controlling using wireless signals provides user convenience, control using wireless signals is used in various applications, but a problem of limited power in devices used therefor may exist due to such technology being based on portability. For example, since a replaceable power element, such as a battery or the like, is commonly used to secure portability, there may be limitations in terms of a power supply.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a wireless signal transmitting apparatus, includes: a piezoelectric harvester configured to generate electrical energy responsive to user switch manipulation; and, a wireless communication circuit configured to generate wireless signals from the electrical energy and wirelessly transmit the wireless signals to an external wireless power receiving device.

The piezoelectric harvester may include: a support portion; an elastic portion coupled to the support portion and configured of an elastic member; and a piezoelectric element fixed to the elastic portion and configured to convert kinetic energy formed in the elastic portion formed by the user switch manipulation into the electrical energy.

The wireless communication circuit may be configured to identify rising edges of the electrical energy formed by the user switch manipulation to generate the wireless signals.

The piezoelectric harvester may be configured to generate the electrical energy according to a push operation of the switch and a return operation of the switch.

A time interval between a first waveform of the electrical energy formed by the push operation and a second waveform of the electrical energy formed by the return operation may be shorter than a reference time interval, the wireless communication circuit may be configured to generate reference pulses as the wireless signals.

An interval of time between a first waveform of the electrical energy formed by the push operation and a second waveform of the electrical energy formed by the return operation may be longer than a reference time interval, the wireless communication circuit may be configured to generate variable pulses corresponding to the interval of time as the wireless signals.

The power supply may include: a rectifier configured to rectify the electrical energy; a condenser configured to store the electrical energy rectified and output by the rectifier; and a converter configured to generate direct current (DC) electricity from charges stored in the condenser and output the generated DC electricity.

According to another general aspect, a wireless illumination control apparatus includes: a first piezoelectric harvester configured to generate first electrical energy in response to an ON switch operation; a second piezoelectric harvester configured to generate second electrical energy in response to an OFF switch operation; and, a wireless communication circuit configured to generate illumination control signals from the first electrical energy and the second electrical energy and wirelessly transmit the illumination control signals to an external illumination device.

The first piezoelectric harvester may include: a support portion; an elastic portion coupled to the support portion and configured of an elastic member; and a piezoelectric element fixed to the elastic portion and configured to convert kinetic energy formed in the elastic portion formed by the ON switch operation into the electrical energy.

The wireless communication circuit may be configured to generate a first illumination control signal having a first frequency from the first electrical energy and generate a second illumination control signal having a second frequency from the second electrical energy.

The first piezoelectric harvester may be configured to generate the first electrical energy according to a push operation and a return operation of the ON switch.

When an interval of time between a first waveform of the electrical energy formed by the push operation and a second waveform of the electrical energy by the return operation is shorter than a reference interval of time, the wireless communication circuit may be configured to generate reference pulses as the illumination control signals.

When an interval of time between a first waveform of the electrical energy formed by the push operation and a second waveform of the electrical energy by the return operation is longer than a reference time interval, the wireless communication circuit may be configured to generate variable pulses corresponding to the interval of time as the illumination control signals.

The variable pulses may be dimming signals of the external illumination devices.

The number of reference pulses may be associated with identification information identifying the external illumination devices.

The wireless signal transmitting apparatus may further include a power supply configured to generate direct current (DC) electricity from the electrical energy and provide the DC electricity to the wireless communication circuit.

The wireless illumination control apparatus may further include a power supply configured to generate direct current (DC) electricity from the electrical energy and provide the DC electricity to the wireless communication circuit.

According to another general aspect, a wireless signal transmitting apparatus, includes: a resiliently deformable member coupled to a piezoelectric harvester, the piezoelectric harvester being configured to generate an electrical energy in response to a physical deformation thereof; and, a wireless communication circuit coupled to the piezoelectric harvester and configured to be both energized using the electrical energy and to transmit a wireless communication signal responsive thereto.

The wireless signal transmitting apparatus may be devoid of a battery and decoupled from external power sources.

The wireless signal transmitting apparatus may further include a power supply coupling the piezoelectric harvester and the wireless communication circuit, the power supply may include: a rectifier configured to rectify the electrical energy; and, a condenser configured to store the electrical energy rectified and output by the rectifier and output the condensed electrical energy to the wireless communication circuit.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views. In the drawings, for example, due to manufacturing techniques and/or tolerances, modifications of the shape shown may result. Thus, embodiments should not be construed as being limited to the particular shapes of regions shown herein, but should, for example, be understood to include a change in shape resulting from manufacturing. The following embodiments may also be constituted by one or a combination thereof.

The embodiments described below may have a variety of configurations.

Figure 1:
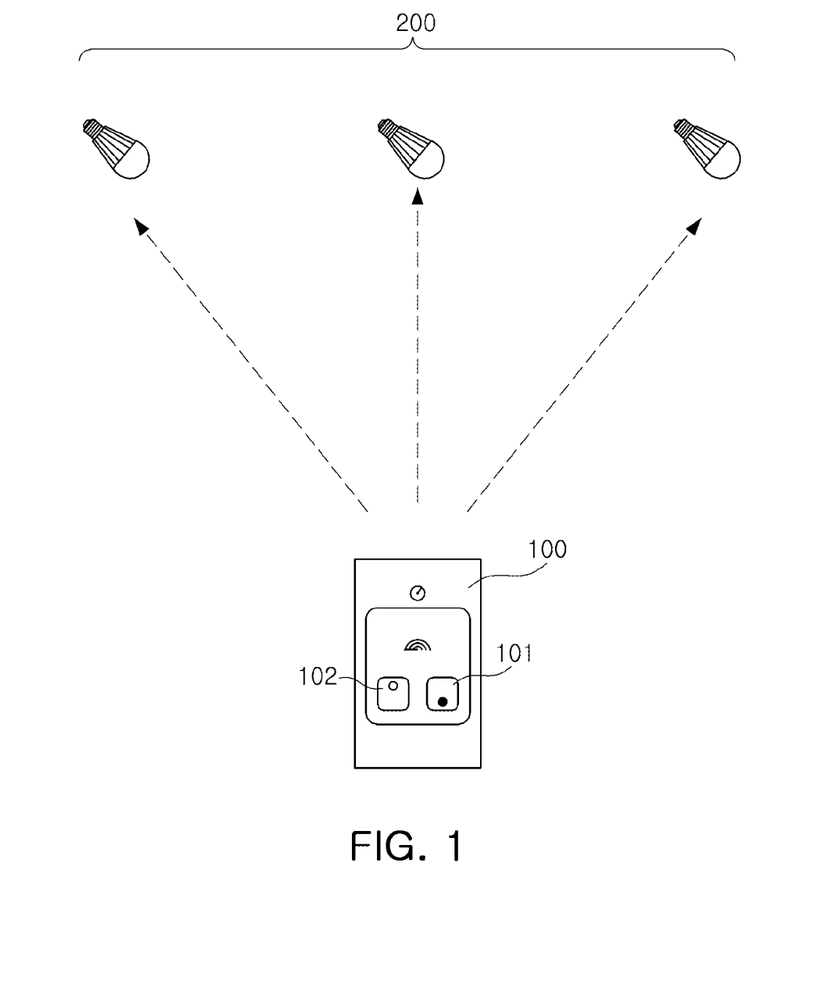
FIG. 1 is a diagram illustrating an example to which a wireless illumination control apparatus according to an embodiment is applied.

FIG. 1 is a diagram illustrating an example to which a wireless illumination control apparatus according to an embodiment is applied.

Referring to FIG. 1, a wireless illumination control apparatus 100 wirelessly transmits illumination control signals to one or more wireless illumination apparatuses 200.

According to an embodiment, the wireless illumination control apparatus 100 includes an OFF switch 101 and an ON switch 102.

The wireless illumination control apparatus 100 converts kinetic energy according to user switch manipulation on the OFF switch 101 and/or the ON switch 102 (individually, or collectively) into electrical energy using a piezoelectric harvester and transmits the illumination control signals to the outside.

The wireless illumination control apparatus 100 is driven by using the kinetic energy generated by user switch manipulation, without a separate power supply (e.g., a battery, or the like) other than the piezoelectric harvester.

Because the wireless illumination control apparatus 100 is an apparatus that wirelessly transmits signals externally, the wireless illumination control apparatus 100 may correspond to a specific embodiment of a wireless signal transmitting apparatus to be described below. Thus, the wireless illumination control apparatus may be understood from a description of the wireless signal transmitting apparatus described below. Further, the wireless signal transmitting apparatus may be understood from a description of the wireless illumination control apparatus.

Figure 2:
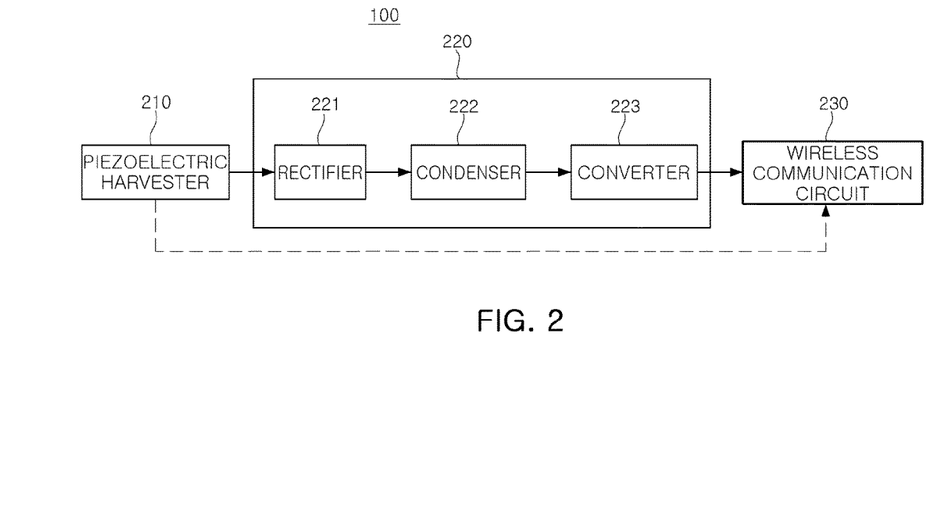
FIG. 2 is a block diagram illustrating a wireless signal transmitting apparatus according to an embodiment.

FIG. 2 is a block diagram illustrating a wireless signal transmitting apparatus according to an embodiment in the present disclosure.

Referring to FIG. 2, a signal transmitting control apparatus includes a piezoelectric harvester 210, a power supply 220, and a wireless communication circuit 230.

The piezoelectric harvester 210 generates electrical energy in response to user switch manipulation.

The piezoelectric harvester 210 receives kinetic energy by user switch manipulation. For example, the piezoelectric harvester 210 is physically connected or coupled to a switch, so as to receive a movement of the switch of the signal transmitting control apparatus.

The piezoelectric harvester 210 outputs electrical energy generated from the kinetic energy.

The electrical energy output by the piezoelectric harvester 210 is used as internal consumption power of the signal transmitting control apparatus. Further, the wireless signals output externally a regenerated from a waveform of the electrical energy.

The power supply 220 generates direct current (DC) electricity from the electrical energy output by the piezoelectric harvester 210 and provides the direct current electricity to the wireless communication circuit 230. For instance, the power supply 220 provides the internal consumption power of the signal transmitting control apparatus using the electrical energy provided from the piezoelectric harvester 210 without a separate power source.

According to an embodiment, the power supply 220 includes a rectifier 221, a condenser 222, and a converter 223. The rectifier 221 rectifies input electrical energy. An output of the rectifier 221 is stored in the condenser 222, and the converter 223 generates direct current (DC) electricity from charges stored in the condenser 222. An output of the converter 223 is provided to the wireless communication circuit 230.

The wireless communication circuit 230 generates wireless signals from the electrical energy output by the piezoelectric harvester 210 and wirelessly transmits the generated wireless signals to external wireless power receiving devices.

According to an embodiment in the present disclosure, the wireless communication circuit 230 identifies rising edges of the electrical energy by a user switch manipulation to generate the wireless signals. For instance, the electrical energy itself may not only be applied as power, but also generates the wireless signals using a generation of edges from the waveform of the electrical energy. The wireless communication circuit 230 may be modified to identify falling edges of the electrical energy to generate the wireless signals. This may be understood from the following description with reference to the examples of FIGS. 5 through 7.

Figure 3:
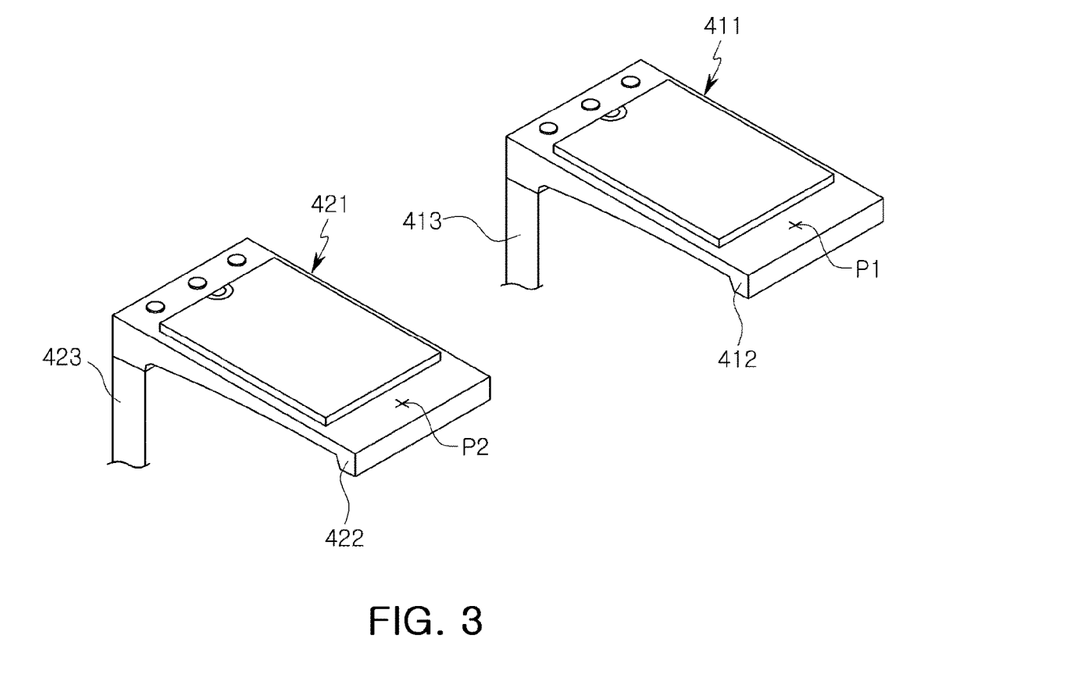
FIG. 3 is a diagram illustrating an example of a piezoelectric harvester according to an embodiment.

FIG. 3 is a diagram illustrating an example of a piezoelectric harvester according to an embodiment.

Referring to FIG. 3, the piezoelectric harvester includes a support portion 413, a resiliently deformable elastic portion 412, and a piezoelectric element 411.

The support portion 413 supports the elastic portion 412 to fix at least a portion of the elastic portion 412.

The elastic portion 412 is an elastic member coupled to the support portion 413. The elastic portion 412 may have elasticity due to a material itself thereof or may also have elasticity by a structure thereof. Alternatively, the elastic portion 412 may also have elasticity by using both the material and the structure thereof.

The elastic portion 412 is movably displaceable by the movement of the switch and also resilient, in that it returns to the unstressed position after a deforming force is removed. In an illustrated example, P1 is a point with which the switch is in contact. In the illustrated example, when pressure is applied to P1 by the switch, the elastic portion 412 is moved in a vertical direction, such as in an arc having a fan shape and when pressure is removed, the elastic portion 412 is resiliently restored to its original position.

The piezoelectric element 411 is fixed to the elastic portion 412. The piezoelectric element 411 converts mechanical deformation or kinetic energy formed in the elastic portion 412 by user switch manipulation into the electrical energy. Although not illustrated, the electrical energy formed in the piezoelectric element 411 is provided to the power supply (220 in FIGS. 2 and 320 in FIG. 4) and the wireless communication circuit (230 in FIGS. 2 and 330 in FIG. 4).

Because the piezoelectric element 411 generates the electrical energy by the movement of the elastic portion 412, the piezoelectric element 411 generates the electrical energy by a push operation of the switch as well as a return operation of the switch. Specifically, the electrical energy includes a waveform formed through the push operation and a waveform formed by a return operation. This may be understood from a description for an example illustrated in FIG. 5.

A structure of the piezoelectric harvester illustrated in FIG. 3 is illustrative, and may be modified as various structures in addition to the illustrated structure.

Figure 4:
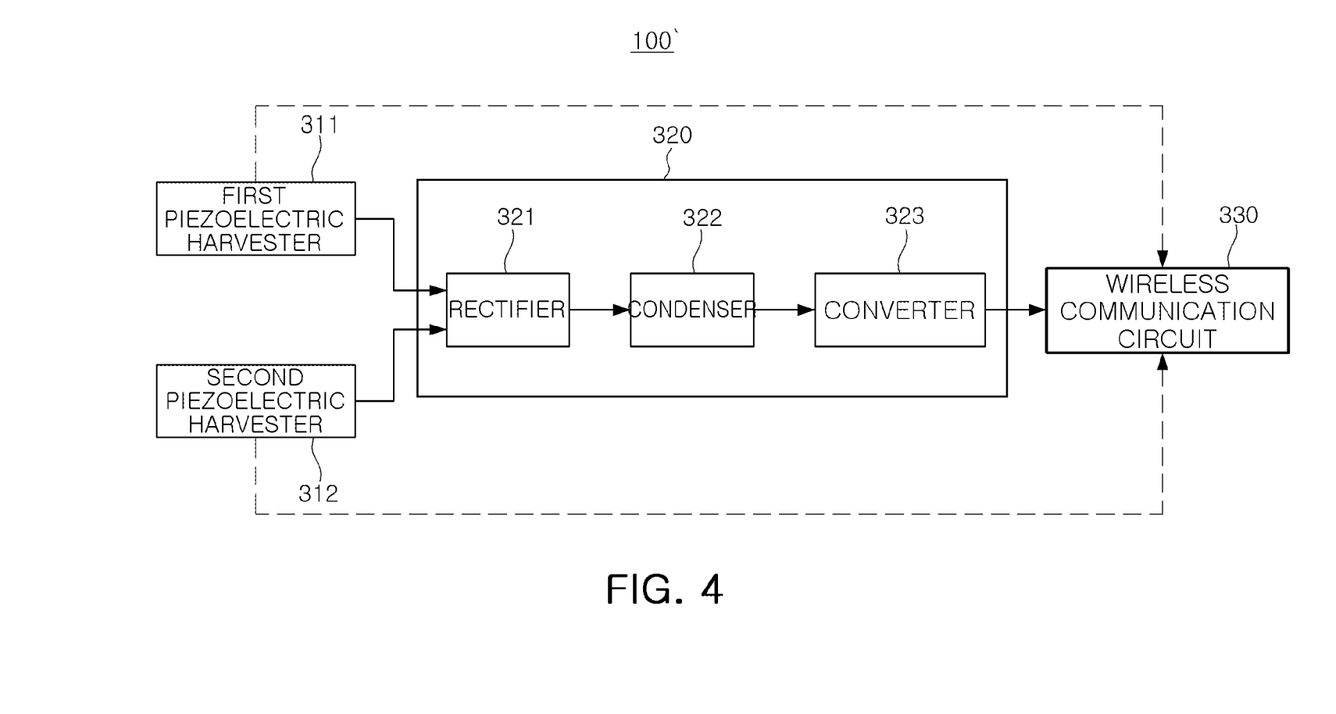
FIG. 4 is a block diagram illustrating a wireless illumination control apparatus according to an embodiment.

FIG. 4 is a block diagram illustrating the wireless illumination control apparatus according to an embodiment.

A wireless illumination control apparatus 100' illustrated in FIG. 4 relates to an example including two switches. As described above, inasmuch as the wireless illumination control apparatus may be an embodiment of the signal transmitting apparatus, a description the same as or corresponding to the description set forth in FIGS. 2 and 3 will be omitted for clarity and conciseness.

Referring to FIG. 4, the wireless illumination control apparatus 100' includes a first piezoelectric harvester 311, a second piezoelectric harvester 312, a power supply 320, and a wireless communication circuit 330.

The first piezoelectric harvester 311 generates first electrical energy in response to an operation of the ON switch, and the second piezoelectric harvester 312 generates second electrical energy in response to an operation of the OFF switch. In other configurations such as, for example, a rocker configuration where the OFF and ON switch are mechanically coupled together about a central pivot point, only one piezoelectric harvester may be employed.

According to an embodiment, although the first electrical energy and the second electrical energy provided to the power supply 320 are not distinct from each other, the first electrical energy and the second electrical energy provided to the wireless communication circuit 330 may be distinct from each other. Because the first electrical energy and the second electrical energy provided to the power supply 320 are used as power, it may be irrelevant to be added to each other or to be interfered with each other, but since the first electrical energy and the second electrical energy provided to the wireless communication circuit 330 are each used as an ON signal and an OFF signal of the illumination control signals, they may be transferred to separate paths so as not to interfere with each other.

The power supply 320 converts the first electrical energy and the second electrical energy into direct current (DC) electricity and provides the DC electricity to the wireless communication circuit 330.

According to an embodiment in the present disclosure, the power supply 320 includes a rectifier 321 that rectifies the first electrical energy and the second electrical energy, a condenser 322 that stores an output of the rectifier, and aconverter 323 that converts charges stored in the condenser into direct current electricity.

The wireless communication circuit 330 generates the illumination control signals from the first electrical energy and the second electrical energy and wirelessly transmits the illumination control signals to external illumination devices.

According to an embodiment, the wireless communication circuit 330 generates a first illumination control signal having a first frequency from the first electrical energy and generates a second illumination control signal having a second frequency from the second electrical energy. Thus, according to the present embodiment, the ON signal and the OFF signal have different frequencies. Accordingly, the illumination apparatus classifies the ON signal and the OFF signal by identifying a received frequency.

Figure 5:
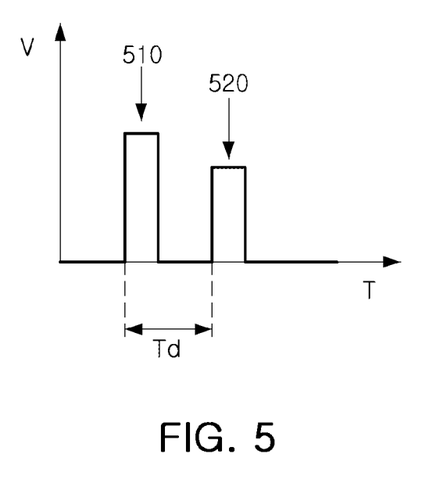
FIG. 5 is a diagram illustrating an example of electrical energy output by the piezoelectric harvester in a single push operation.

FIG. 5 is a diagram illustrating an example of electrical energy output by the piezoelectric harvester in a single push operation.

In the illustrated example, the piezoelectric harvester generates electrical energy 510 from a movement by a push operation of the switch and also generates electrical energy 520 from a movement by a return operation of the switch.

The electrical energy illustrated in FIG. 5 is illustrative and is illustrated as pulses by simplifying electrical energy which is actually output. Thus, the electrical energy which is actually output may be illustrated as having alternating current waveforms, rather than pulses.

As seen in FIG. 5, the electrical energies 510 and 520 generated by the piezoelectric harvester are formed through the push operation and the return operation, respectively. Thus, a push time is calculated by using a time (Td) between the push operation and the return operation.

The wireless communication circuit (230 in FIGS. 2 and 330 in FIG. 4) generates the wireless signals or the illumination control signals (hereinafter, denoted as illumination control signals) from the waveforms of the electrical energy.

Hereinafter, an example in which the wireless communication circuit generates the illumination control signals from the waveforms of the electrical energy will be described with reference to FIGS. 6 and 7.

Figure 6:
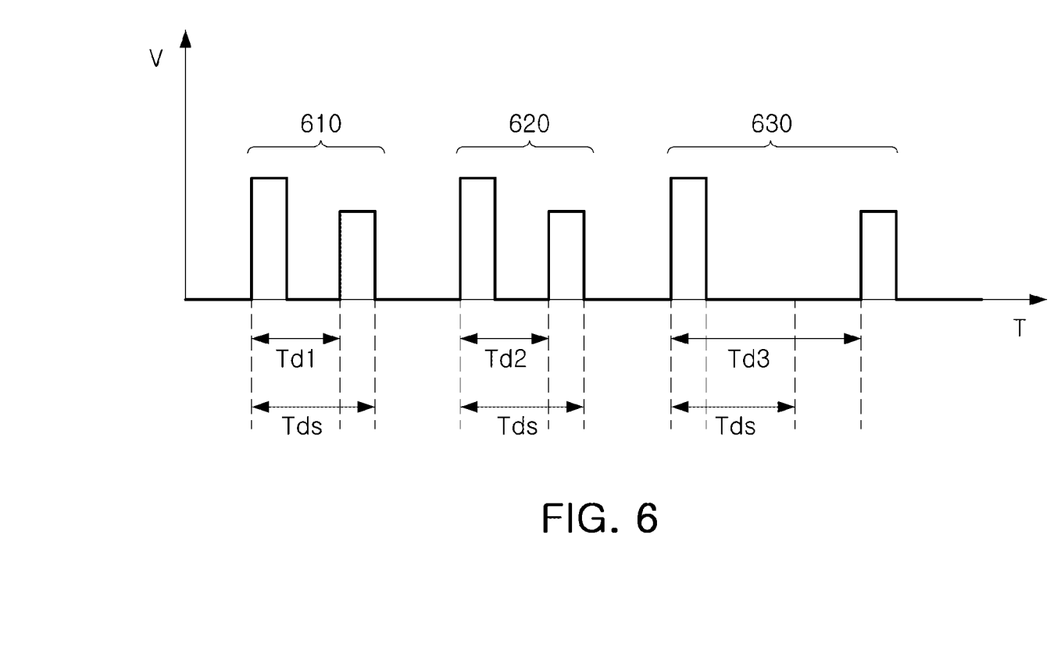
FIG. 6 is a diagram illustrating another example of the electrical energy output by the piezoelectric harvester.
Figure 7:
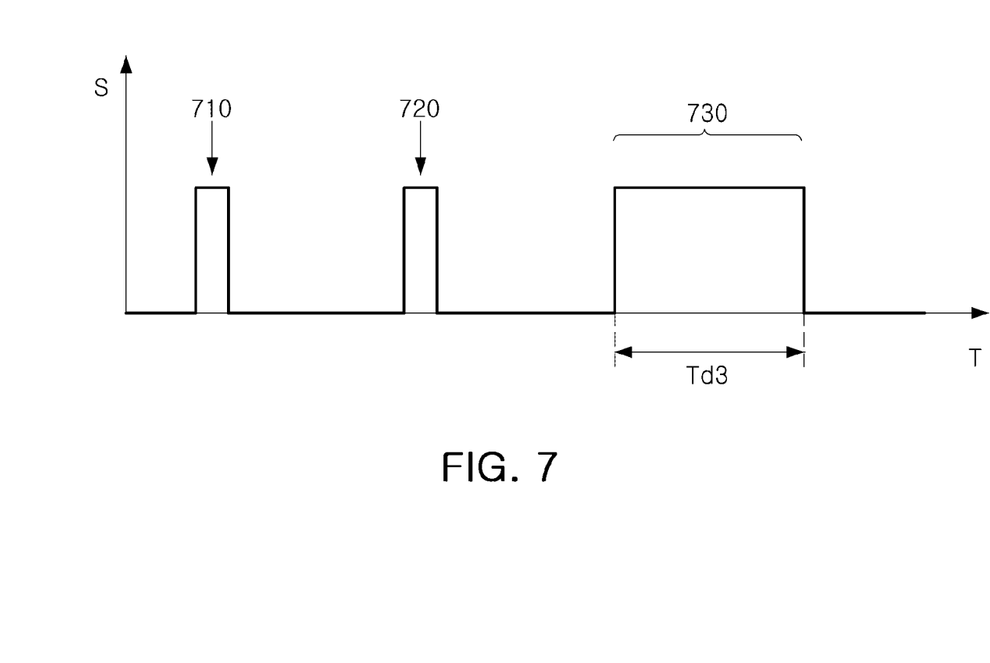
FIG. 7 is a diagram illustrating an example of an illumination control signal generated from the electrical energy illustrated in FIG. 6.

FIG. 6 is a diagram illustrating an example of the electrical energy output by the piezoelectric harvester and FIG. 7 is a diagram illustrating an example of an illumination control signal generated from the electrical energy illustrated in FIG. 6.

First, referring to FIG. 6, the electrical energy includes six pulses. As described above with reference to FIG. 5, inasmuch as the pulses are respectively formed through the push operation and the return operation, it may be seen from the example of FIG. 6 that three push operations 610, 620, and 630, and three return operations corresponding to the push operations are generated.

According to an embodiment, the wireless communication circuit (230 in FIGS. 2 and 330 in FIG. 4) identifies rising edges of the electrical energy by a user switch manipulation to generate the illumination control signals. In the case of the illustrated example, one pulse signal is generated at odd-numbered rising edges.

Referring also to FIG. 7 which corresponds in time to FIG. 6, the wireless communication circuit (230 in FIGS. 2 and 330 in FIG. 4) generates a first pulse 710 in response to a first push operation 610 (seen in FIG. 6), a second pulse 720 in response to a second push operation 620, and a third pulse 730 in response to a third push operation 630.

Although the example described above describes an example in which the illumination control signals are generated on the basis of the rising edges, it will be apparent that the illumination control signals may also be generated on the basis of falling edges according to embodiments.

The wireless communication circuit (230 in FIGS. 2 and 330 in FIG. 4) generates a pulse signal or a reference pulse by using a time interval between a waveform formed through the push operation of the electrical energy and a waveform by the return operation of the electrical energy.

As an example, in a case in which a time interval between a first waveform of the electrical energy formed through the push operation and a second waveform of the electrical energy by the return operation is shorter than a reference time interval, the wireless communication circuit (230 in FIGS. 2 and 330 in FIG. 4) generates the reference pulse as the illumination control signal.

In the examples illustrated in FIGS. 6 and 7, since a first time interval Td1 between the waveform by the first push operation and the waveform 610 by a first return operation is shorter than a reference time interval Tds, the wireless communication circuit (230 in FIGS. 2 and 330 in FIG. 4) generates a first unit pulse 710. Further, since a second time interval Td2 between a second push operation and a second return operation 620 is also shorter than the reference time interval Tds, it is seen that a second unit pulse 720 is generated.

As another example, in a case in which a time interval between the first waveform of the electrical energy formed through the push operation and the second waveform of the electrical energy by the return operation is longer than the reference time interval, the wireless communication circuit (230 in FIGS. 2 and 330 in FIG. 4) generates a variable pulse corresponding to the time interval as the illumination control signal.

In the examples illustrated in FIGS. 6 and 7, since a third time interval Td3 between a waveform by a third push operation and a waveform 630 by the third return operation is equal to the reference time interval Tds or longer, the wireless communication circuit (230 in FIGS. 2 and 330 in FIG. 4) generates a variable pulse 730 corresponding to the third time interval Td3.

According to an embodiment, the variable pulse is used as a dimming signal of the external illumination devices. Further, the number of reference pulses is associated with identification information that identifies the external illumination devices. For example, the illumination control signal including two reference pulses and one variable pulse as illustrated in FIG. 7 is used as a control signal for a third illumination apparatus. For instance, the number of pulses acts as identification information that identifies one or more of the external illumination devices, and a length of the variable pulse may be used as the dimming signal.

The apparatuses, units, modules, devices, and other components (e.g., wireless communication circuit 230 and 330) illustrated in FIGS. 2 and 4 that perform the operations described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated that perform the operations described herein may be performed by a processor or a computer as described above executing instructions or software to perform the operations described herein.

Instructions or software to control a processor or computer to implement the hardware components and perform the methods as described above may be written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

According to an embodiment, the illumination apparatuses may also be identified by using only the number of unit pulses, and it will be apparent that various embodiments related thereto are possible.

As set forth above, according to the embodiments, the wireless signal transmitting apparatus supplies the power without the separate replaceable power element by securing the power from user switch manipulation operation of the user.

The wireless illumination control apparatus according to another embodiment may provide an effect that the dimming signal may be generated by a single manipulation.

While embodiments have been shown and described above, it will be apparent to those skilled in the art that modifications and variations could be made without departing from the scope of the present invention as defined by the appended claims.

What is claimed is:

1. A wireless signal transmitting apparatus, comprising:
a piezoelectric harvester configured to generate electrical energy responsive to user switch manipulation; and,
a wireless communication circuit configured to generate wireless signals from the electrical energy and wirelessly transmit the wireless signals to an external wireless power receiving device,
wherein the wireless signals are determined by a time interval between a first waveform of the electrical energy formed by a push operation and a second waveform of the electrical energy formed by a return operation.

2. The wireless signal transmitting apparatus of claim 1, wherein the piezoelectric harvester comprises:
a support portion;
an elastic portion coupled to the support portion and comprising an elastic member; and
a piezoelectric element fixed to the elastic portion and configured to convert kinetic energy formed in the elastic portion formed by the user switch manipulation into the electrical energy.

3. The wireless signal transmitting apparatus of claim 1, wherein the wireless communication circuit is configured to identify rising edges of the electrical energy formed by the user switch manipulation to generate the wireless signals.

4. The wireless signal transmitting apparatus of claim 1, wherein the piezoelectric harvester is configured to generate the electrical energy according to the push operation of the switch and the return operation of the switch.

5. The wireless signal transmitting apparatus of claim 4, wherein when the time interval between the first waveform of the electrical energy formed by the push operation and the second waveform of the electrical energy formed by the return operation is shorter than a reference time interval, and the wireless communication circuit is configured to generate reference pulses as the wireless signals.

6. The wireless signal transmitting apparatus of claim 4, wherein when an interval of time between the first waveform of the electrical energy formed by the push operation and the second waveform of the electrical energy formed by the return operation is longer than a reference time interval, and the wireless communication circuit is configured to generate variable pulses, as the wireless signals, corresponding to the interval of time.

7. The wireless signal transmitting apparatus of claim 1 further comprising a power supply, wherein the power supply comprises:
a rectifier configured to rectify the electrical energy;
a condenser configured to store the electrical energy rectified and output by the rectifier; and
a converter configured to generate direct current (DC) electricity from the electrical energy stored in the condenser and output the generated DC electricity.

8. The wireless signal transmitting apparatus of claim 1, further comprising a power supply configured to generate direct current (DC) electricity from the electrical energy and provide the DC electricity to the wireless communication circuit.

9. A wireless illumination control apparatus comprising:
a first piezoelectric harvester configured to generate first electrical energy in response to an ON switch operation;
a second piezoelectric harvester configured to generate second electrical energy in response to an OFF switch operation; and,
a wireless communication circuit configured to generate illumination control signals from the first electrical energy and the second electrical energy and wirelessly transmit the illumination control signals to an external illumination device.

10. The wireless illumination control apparatus of claim 9, wherein the first piezoelectric harvester comprises:
a support portion;
an elastic portion coupled to the support portion and configured of an elastic member; and
a piezoelectric element fixed to the elastic portion and configured to convert kinetic energy formed in the elastic portion formed by the ON switch operation into the electrical energy.

11. The wireless illumination control apparatus of claim 9, wherein the wireless communication circuit is configured to generate a first illumination control signal having a first frequency from the first electrical energy and generate a second illumination control signal having a second frequency from the second electrical energy.

12. The wireless illumination control apparatus of claim 9, wherein the first piezoelectric harvester is configured to generate the first electrical energy according to a push operation and a return operation of the ON switch.

13. The wireless illumination control apparatus of claim 12, wherein when an interval of time between a first waveform of the electrical energy formed by the push operation and a second waveform of the electrical energy by the return operation is shorter than a reference interval of time, the wireless communication circuit is configured to generate reference pulses as the illumination control signals.

14. The wireless illumination control apparatus of claim 13, wherein the number of reference pulses is associated with identification information identifying the external illumination devices.

15. The wireless illumination control apparatus of claim 12, wherein when an interval of time between a first waveform of the electrical energy formed by the push operation and a second waveform of the electrical energy by the return operation is longer than a reference time interval, the wireless communication circuit is configured to generate variable pulses corresponding to the interval of time as the illumination control signals.

16. The wireless illumination control apparatus of claim 15, wherein the variable pulses are dimming signals of the external illumination devices.

17. The wireless illumination control apparatus of claim 9, further comprising a power supply configured to generate direct current (DC) electricity from the electrical energy and provide the DC electricity to the wireless communication circuit.

18. A wireless signal transmitting apparatus, comprising:
a resiliently deformable member coupled to a piezoelectric harvester, the piezoelectric harvester being configured to generate an electrical energy in response to a physical deformation thereof; and,
a wireless communication circuit coupled to the piezoelectric harvester and configured to be both energized using the electrical energy and to transmit a wireless communication signal responsive thereto, wherein the wireless communication signals are determined by a time interval between a first waveform of the electrical energy formed by a push operation and a second waveform of the electrical energy formed by a return operation.

19. The wireless signal transmitting apparatus of claim 18, wherein the wireless signal transmitting apparatus is devoid of a battery and decoupled from external power sources.

20. The wireless signal transmitting apparatus of claim 18, further comprising a power supply coupling the piezoelectric harvester and the wireless communication circuit, the power supply comprising:
   a rectifier configured to rectify the electrical energy; and,
   a condenser configured to store the electrical energy rectified and output by the rectifier and output the condensed electrical energy to the wireless communication circuit.

* * * * *